Patented Dec. 18, 1945

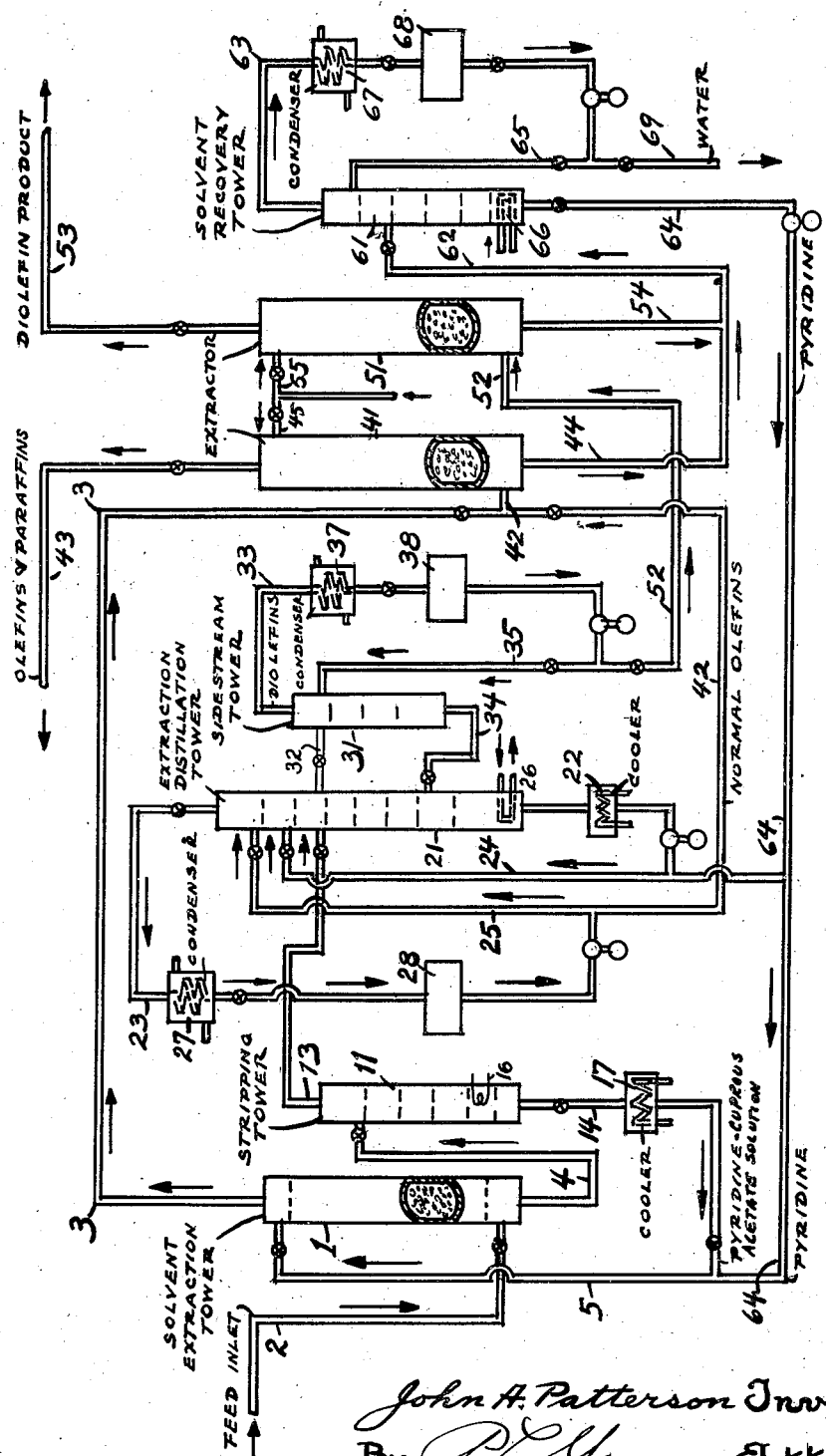

2,391,102

UNITED STATES PATENT OFFICE 2,391,102

SEPARATION AND PURIFICATION OF HYDROCARBONS

John A. Patterson, Westfield, N. J., assignor to Standard Oil Development Company, a corporation of Delaware Application January 1, 1943, Serial No. 470,977

7 Claims. (Cl. 260—681.5)

This invention relates to the treatment of mixtures of hydrocarbons of the $C_3$ to $C_8$ range to effect the separation and purification of paraffins, mono-olefins and diolefins. The invention relates particularly to the separation of diolefins from their admixture with other hydrocarbons in the products of the treatment of petroleum fractions and also to the purification of diolefins.

Great importance today is attached to the preparation of synthetic products from the lower molecular weight unsaturated hydrocarbons. Such important products as synthetic rubber and alcohols are being prepared by processes employing unsaturated hydrocarbons as raw materials. The development of such synthetic processes is, however, largely determined by the availability of the respective unsaturated hydrocarbons in a high degree of purity. Fractional distillation as a means of separating the unsaturated hydrocarbons from complex mixtures containing hydrocarbons of about the same molecular weight is completely unsatisfactory because of the closely related physical properties and the difficulties involved in preventing polymerization. It has been proposed to combine a fractional distillation with extractive distillation as a means for separating the various unsaturated hydrocarbons from the saturated hydrocarbons. Such processing is clearly limited to the capacity of processing based upon such a combination. The present invention is a further advance in the separation of individual hydrocarbons from complex mixtures.

In fractional distillation separation of components is made upon the basis of their normal vapor pressures in the presence of other constituents of the hydrocarbon mixture. In extractive distillation, the separation of groups of compounds is made on the basis of the relative volatilities of various groups of compounds in the presence of an added solvent. The present invention is concerned with extractive distillation combined with a selective solvent extraction, enabling the separation of compounds not convenient by either fractional distillation or extractive distillation alone or in combination. By combining this selective solvent extraction with extractive distillation, processing of complex mixtures of hydrocarbons can be made as a basis for separating readily many unsaturated compounds otherwise not commercially feasible.

In the separation of hydrocarbons by distillation in the presence of a polar solvent as occurs in extractive distillation, the presence of the solvent changes the relative volatilities of the hydrocarbons, so that the volatilities of olefinic hydrocarbons relative to paraffins are lowered and the relative volatilities of the diolefins are lowered to a greater extent than those of the mono-olefins. In such a system the relative volatility of two compounds of about the same degree of unsaturation such as trimethylethylene and pentene-1 is changed to about the same extent. On the other hand, extraction of a close-boiling hydrocarbon mixture with a selective solvent such as a cuprous complex salt solution results in the absorption selectively of groups of compounds about the same molecular weight in relation to their structure and to a lesser extent upon their degree of unsaturation. Thus, straight chain hydrocarbons are, in general, more soluble in these solutions than the corresponding branched compounds, and also, in general, the higher the degree of unsaturation and the lower the molecular weight, the greater the solubility. For example, pentene-1 is more readily extracted from a complex mixture than trimethylethylene by a selective solvent of the type of cuprous acetate dissolved in pyridine solution, since such a solution has a marked selective solvency for the straight-chain olefins. By a combination, therefore, of selective solvency and extractive distillation, separation can be conveniently made of olefins from diolefins on the basis of both structure and degree of unsaturation.

Any cuprous salt dissolved in a basic reacting organic nitrogen compound is advantageous as a selective solvent. Particular basic reacting organic nitrogen compounds advantageous as solvents for the cuprous salts are pyridine and the amines. The selective solvent of this invention is advantageously employed at temperatures between 30° and 125° F., and preferably at about 90° F. A particularly suitable composition is cuprous acetate dissolved in pyridine solution.

As an illustration of the invention, the separation of a mixture containing pentene-1, trimethylethylene and isoprene in addition to other $C_5$ hydrocarbons may be taken. These hydrocarbons have such closely related boiling points that complete separation by fractional distillation, even under high reflux ratios, is not practical even in the laboratory. When the mixture containing the three hydrocarbons is, however, subjected to extractive distillation in which aqueous pyridine is used as the solvent, pentene-1 may be readily separated in the distillate material. Trimethylethylene may also be separated from isoprene by extractive distillation. However, in the absence of the solvent, isoprene has a normal volatility greater than that of trimethylethylene.

so that the difference in volatility in the presence of the solvent is not sufficient to permit ready separation. When the residue, however, from the extractive distillation is extracted with cuprous acetate pyridine solution, the isoprene is selectively absorbed, so that the undissolved portion contains essentially all of the trimethylethylene. Thus, mixtures containing the three hydrocarbons may be readily and efficiently separated by a combination of extractive distillation and selective solvency with cuprous acetate pyridine solution.

In many cases, it is advantageous to treat a complex hydrocarbon mixture with the selective solvent of this invention previous to extractive distillation. In other cases, it may be advantageous to separate a complex mixture first on the basis of fractional distillation and then to subject a particular fraction to the selective solvent extraction and extractive distillation according to this invention. The particular order is determined largely by the content of the particular unsaturated materials dissolved by the selective solvent and thus the economics of the processing, according to a particular order.

A special feature of the combination extractive distillation and selective solvent extraction is that, if the same basic nitrogen compound, such as pyridine, is employed as the solvent in both steps of such processing, there is the convenience of obviating intermediate solvent removal. For example, when the cuprous salt dissolved in pyridine is employed as the selective solvent in the first step of such processing, the hydrocarbons regenerated from the extract fractions contains a considerable quantity of pyridine. Such material may then be directly fed to the extractive distillation system by adjusting the solvent circulation in that operation. When the order of processing is reversed, the step of freeing the distillate product from the extractive distillation completely of pyridine is clearly unnecessary. The cuprous salt-pyridine extraction operation may be readily adjusted to compensate for the pyridine content of the feed to the solvent extraction treatment.

In order to illustrate the invention more specifically, the following example is presented. The numerals given in the description refer to the accompanying drawing, in which is outlined a suitable lay-out of processing equipment. In this example, the feed supply is a debutanized refinery cracked stock of boiling range from 60° F. to 400° F. obtained from high temperature operation, that is, a stock consisting essentially of $C_5$ to $C_6$ hydrocarbon. The illustration is taken of the extraction of transpiperylene from this stock.

The feed is introduced near the bottom of tower 1 through line 2. Tower 1 is any form of suitable equipment for effecting countercurrent liquid-liquid extraction. Thus, tower 1 may be a tower packed with Raschig rings or other contacting devices. The feed passes upwards through the tower countercurrently to a stream of cuprous acetate-pyridine solution introduced at the top of the tower through line 5. During the countercurrent operation, the cuprous acetate-pyridine solution extracts from the feed the content of transpiperylene and other diolefins and straight chain olefins and leaves undissolved paraffins and branched chain olefins. The extract material is removed through line 4 and passes to the stripping tower 11. The undissolved portion of the feed, together with some dissolved pyridine, is withdrawn through line 3 for subsequent treatment for recovery of the pyridine.

Tower 11 may be any suitable type of distillation equipment, such as a bubble plate tower containing about 10 plates. The tower is provided with a heating means 16. In the tower 11 the cuprous solution is stripped of its hydrocarbon content. The stripped cuprous acetate pyridine solution is withdrawn at the base of the tower through line 14, cooled in heat exchanger 17 and recycled through line 5 to tower 1. The hydrocarbon distillate containing some pyridine is passed through line 13 to the extractive distillation tower 21.

Tower 21 is any suitable type of distillation unit, but preferably of bubble plate construction having from 50 to 60 plates. The vapor feed stock supplied through line 13 is introduced near the middle of the tower. Pyridine-water as the extractive solvent is introduced through line 24 near the top of the tower. Equipment 26 supplies heat to the tower. The solvent introduced through line 24 is adjusted to maintain a ratio in the liquid on the plates of three volumes of solvent to one volume of hydrocarbon in the region between the solvent inlet 24 and the side stream withdrawal line 32. In the tower below the level of the line 32 connection, the solvent is concentrated as it passes toward the base of the tower so that relatively pure solvent is withdrawn at the base. The solvent is cooled in heat exchanger 22 and recycled through line 24 to tower 21. In the presence of the solvent the relative volatilities of the $C_5$ hydrocarbons are such that the straight chain olefins are taken overhead through line 23 as distillate, while the diolefins together with some pyridine and water are withdrawn through line 32. The normal olefin distillate withdrawn through line 23 is condensed in equipment 27 and collected in equipment 28. A portion of the condensate is returned as reflux to the top of tower 21 through line 25, while the remainder is withdrawn through line 42 for subsequent treatment.

The diolefin solvent vapor mixture removed from the tower through line 32 is introduced into the side stream tower 31. Tower 31 may be of any suitable type for effecting distillation, but preferably of bubble type construction similar to tower 21, except as to having only about 10 plates. The vapor feed through line 32 furnishes the heat required to operate the tower 31. In the tower 31 the diolefins are freed of most of the pyridine and water. The pyridine and water are returned from the base of the tower 31 through line 34 to tower 21.

The distillate from tower 31 consisting of diolefins and small amounts of pyridine and water is withdrawn through line 33 and condensed in equipment 37. The condensate is collected in the drum 38. Sufficient condensate from the drum 38 is refluxed to the tower 31 through line 35 to maintain the proper operating conditions in tower 31. The remainder of the condensate is withdrawn from the drum 38 through line 52 for subsequent treatment.

The concentrated diolefins separated as a stream through line 52 are introduced near the base of extraction tower 51. Tower 51 may be any suitable device for countercurrent liquid-liquid contacting device, preferably a tower packed with Raschig rings. The diolefin stream passes upward through the tower countercurrent to a stream of water introduced near the top through line 55. The water extracts the pyridine from the diolefin mixture, the latter passing out of the top of tower 51 through line 53 for further treatment in the purification of transpiperylene. The water extract is withdrawn at the base of the tower through line 54 for subsequent treatment.

The undissolved paraffin and branched chain olefin stream which is withdrawn from tower 1 through line 3 is combined with the normal olefin distillate fraction stream passing through line 42. The combined stream is introduced into tower 41 near its base. Tower 41 is similar to tower 51. Water is introduced near the top of the tower through line 45 and flows downward countercurrent to the olefin-paraffin mixture and removes from the mixture the dissolved pyridine. The paraffin olefin stream is withdrawn at the top of tower 41 through line 43 and discarded from the system. The water extract of pyridine is withdrawn through line 44 at the base of the tower.

The water extracts from the towers 41 and 51 which are withdrawn through lines 44 and 54 respectively are combined and passed through line 62 to the solvent recovery tower 61. Tower 61 may be any suitable type of distillation unit, but is preferably of bubble plate construction containing about 10 bubble cap plates. The base of the tower is furnished with heating means 66. The overhead product of the tower system consists of essentially pure water and is withdrawn through line 63, condensed in equipment 67 and cooled in drum 68. A portion of the distillate in 68 is returned as reflux through line 65 in order to maintain the proper operating conditions in tower 61. The remainder is withdrawn through line 69 and may be either discarded or recycled through lines 45 and 55 to towers 41 and 51 respectively. The bottoms from tower 51 consisting of highly concentrated pyridine is withdrawn through line 64 and added to either the recycling cuprous acetate-pyridine solution contained in line 5 or to the recycling pyridine water solvent circulating in line 24 to make up for the solvent carried out of the towers 1 and 21 in the products. The operation of tower 61 may be adjusted by means of control of the heat supplied through equipment 66 and the reflux supplied through line 65, so that the pyridine removed through line 64 will contain proper concentration of water for combination with the solvent solutions used in the solvent extraction and extractive distillation operations.

What is claimed is:

1. The process of separating an individual unsaturated hydrocarbon of the $C_3$ to $C_8$ range from a complex hydrocarbon mixture, which comprises treating the mixture with a cuprous complex salt solution containing a basic reacting organic nitrogen compound, separating the extract and raffinate solutions, removing the cuprous complex salt from the extract solution and solvent from the raffinate solution, and subjecting the resultant products to an extractive distillation in which said basic reacting organic nitrogen compound is employed as extractive solvent.

2. The process according to claim 1, in which the cuprous complex salt solution is cuprous acetate in pyridine.

3. The process according to claim 1, in which the cuprous complex salt solution is cuprous acetate in aqueous pyridine.

4. The process according to claim 1, in which the cuprous complex salt solution is cuprous acetate in an amine.

5. The process of separating an individual $C_5$ unsaturated hydrocarbon from a mixture of $C_5$ to $C_9$ hydrocarbons, which comprises treating the mixture with cuprous acetate in a basic reacting organic nitrogen compound, separating the extract and raffinate solutions, removing the cuprous acetate from the extract solution and the basic reacting organic nitrogen compound from the raffinate solution, and subjecting the resultant products to an extractive distillation in which said basic reacting organic nitrogen compound is employed as extractive solvent.

6. The process according to claim 5, in which the individual $C_5$ unsaturated hydrocarbon separated from the mixture of $C_5$ to $C_9$ hydrocarbons is isoprene and in which the basic reacting organic-nitrogen compound is pyridine.

7. The process according to claim 5, in which the individual $C_5$ unsaturated hydrocarbon separated from the mixture of $C_5$ to $C_9$ hydrocarbons is trans-piperylene and in which the basic reacting organic-nitrogen compound is pyridine.

JOHN A. PATTERSON.